United States Patent [19]

Gibbons

[11] 3,978,335

[45] Aug. 31, 1976

[54] ELECTROGRAPHIC RECORDING PROCESS

[75] Inventor: Carl B. Gibbons, Ogden, Utah

[73] Assignee: Eastman Kodak Company, Rochester, N.Y.

[22] Filed: Oct. 22, 1975

[21] Appl. No.: 624,814

Related U.S. Application Data

[63] Continuation of Ser. No. 519,169, Oct. 30, 1974, abandoned.

[52] U.S. Cl. .......................... 250/320; 250/315 A; 250/327

[51] Int. Cl.² ...................... G03B 5/17; G03C 5/16; G03G 13/00

[58] Field of Search ............... 250/315 A, 316, 320, 250/323, 327

[56] References Cited

UNITED STATES PATENTS 3,719,824 3/1973 McMaster et al. .................. 250/320

*Primary Examiner*—Alfred E. Smith
*Assistant Examiner*—T. N. Grigsby
*Attorney, Agent, or Firm*—D. I. Hague

[57] ABSTRACT

A recording process is disclosed in which an X-ray sensitive photoconductive element exhibiting persistent conductivity and a charge sensitive, dry processable recording material are sandwiched between a pair of electrodes. A source of potential is applied across the electrodes and the photoconductive element is briefly exposed to an imagewise pattern of X-ray radiation forming a latent image in the recording material. Allowing the current to continue to flow through the sandwich after the X-ray exposure is terminated increases the sensitivity of the recording process by a factor of up to 100. The latent image is then amplified and rendered visible by uniformly heating the entire recording material.

9 Claims, 3 Drawing Figures

ELECTROGRAPHIC RECORDING PROCESS

CROSS REFERENCE TO RELATED APPLICATIONS

This is a continuation of application Ser. No. 519,169, filed Oct. 30, 1974, now abandoned.

Reference is made to the commonly assigned, copending U.S. application Ser. No. 492,814, entitled "Electrographic Recording Apparatus and Process", filed on July 29, 1974 in the names of J. Y. Kaukeinen and D. A. Rockafellow.

BACKGROUND OF THE INVENTION

The present invention relates to an image recording process wherein latent images are: (1) formed in certain recording elements containing a reducible metal compound by flowing a small, imagewise pattern of electrical current therein and (2) subsequently dry processed to produce a visible image.

U.S. Pat. No. 3,138,547, issued June 23, 1964, in the name of B. L. Clark discloses that visible images can be formed in certain electrosensitive recording materials comprising a continuous electrically conductive layer and a contiguous layer composed of at least one particulate metal compound capable of electrical reduction in situ. Recording is effected by passing through the recording material an imagewise current of sufficient magnitude to reduce the particulate metal compound in the dry state. The free metal produced provides a visible image which varies in intensity in accordance with the current passed.

A drawback of the recording process disclosed by Clark is that it incorporates no gain or amplification. For each reduction event leading to an increase in density of the final image, an additional quantity of electronic charge flowing through the recording material must be provided. Thus, relatively high current densities must be provided in order to produce a visible image in a reasonable period of time.

In the above-referenced U.S. application Ser. No. 492,814, incorporated herein by reference, an electrographic recording process is disclosed which forms a latent image in certain charge-sensitive, dry processable recording materials by passing a relatively minute amount of electrical charge through the material in an imagewise pattern. The latent image is then amplified and rendered visible by heating the entire recording material substantially uniformly. Since the charge exposure is required only for latent image formation, the magnitude of such charge exposure (approximately 1 microcouloumb/cm$^2$) has been found to be several orders of magnitude less than that required by the prior art dry direct image recording processes. Another advantage of the new process is its ability to record information emanating from a variety of exposure sources including tungsten lamps, xenon lamps, helium-neon laser beams, infrared radiation and X-ray radiation by the appropriate selection of a photoconductor which serves as an opto-electrical transducing device. Any source of radiation to which the photoconductor is responsive may be used as the exposure source, provided that the dynamic resistance of the photoconductor closely matches the dynamic resistance of the recording material in the operating voltage range of the process.

When X-ray radiation is used as the exposure source, it is usually desirable for health and safety reasons to limit the quantity of such X-ray radiation to the lowest level required to produce a copy of a desired density or contrast.

SUMMARY OF THE INVENTION

It is, therefore, an object of the present invention to improve the electrographic recording process disclosed in the above referenced U.S. application Ser. No. 492,814, by providing a means to decrease the quantity of X-ray exposure radiation required to produce a copy of a given density or contrast.

Another object of the invention is to provide the aforementioned improvement to such electrographic recording process without increasing its complexity.

These and other objects and advantages are achieved in accordance with the present invention by using a photoconductive element exhibiting persistent conductivity as the opto-electrical transducer device and allowing the current to continue to flow imagewise through the photoconductive element and recording material after the exposure of the photoconductive element is completed. Allowing the electric potential applied between the photoconductive element and the recording material to remain on for a short period of time (up to 5 minutes) after the exposure is completed increases the system's sensitivity, i.e. decreases the quantity of exposure required to produce a print of a given density or contrast, by a factor of 10 to 100.

The invention, its operation, and its objects and advantages will become more apparent by referring to the accompanying drawings and to the ensuing detailed description of the preferred embodiment which follows.

DETAILED DESCRIPTION OF THE PREFERRED EMBODIMENT

Figure 1:
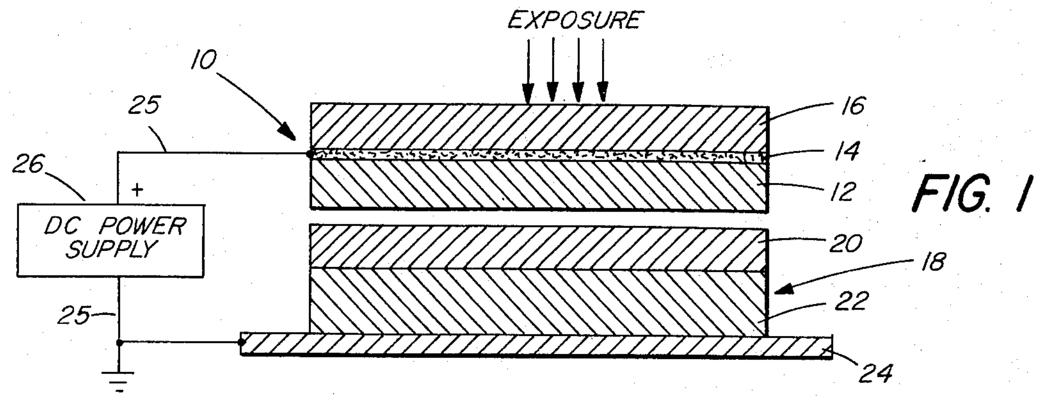
FIG. 1 is a schematic diagram of apparatus useful in carrying out the process of the present invention.

The process of the present invention utilizes a charge-sensitive, dry processable recording material or element and a photoconductive element exhibiting persistent conductivity. The term "charge-sensitive material", as used herein, denotes a material which, when subjected to an electrical charge, undergoes a chemical and/or electrical change which forms a latent image. The term "latent image" as used herein, denotes an invisible or faintly visible image which is capable of amplification in a subsequent development process. The term "dry processable", as used herein, denotes a recording material which can be processed to produce a visible image by uniformly heating the entire recording material without the addition of chemical compounds or elements, such processing appearing to the user to be dry from start to finish.

A variety of charge-sensitive, dry processable recording materials formulated to accomodate the needs of the particular recording situation can be used in the process of the present invention. Useful recording materials are described in the above-referenced U.S. application Ser. No. 492,814.

A typical charge-sensitive, dry developable recording material useful in the process of the present invention comprises an electrically conductive support or, alternatively, a support coated with a conducting layer, the support having thereon at least one layer comprising an image-forming combination including (i) a reducible metal salt with (ii) a reducing agent for the reducible metal salt in (iii) a binder for the layer. A variety of reducible metal salts are useful in the described charge sensitive materials. Typical metal salts are silver salts of organic acids, such as fatty acids, which are resistant to darkening upon illumination. An especially useful class of silver salts is the visible light insensitive silver salts of long-chain fatty acids which include, for example, silver behenate, silver stearate, silver oleate, silver laurate, silver hydroxystearate, silver caprate, silver myristate and silver palmitate. Silver salts can be employed which are not silver salts of long-chain fatty acids if desired. Also, combinations of silver salts of long-chain fatty acids with silver salts which are not silver salts of long-chain fatty acids can be employed. Useful silver salts which are not silver salts of long-chain fatty acids include, for example, silver benzoate, silver benzotriazole, silver terephthalate, silver phthalate, and the like. Silver salts of a heterocyclic thione compounds are examples of other metal salts which are useful. These include, for example, silver salts of 3-carboxymethyl-4-methyl-4-thiazoline-2-thione, 3-(2-carboxyethyl)-4-hydroxymethyl-4-thiazoline-2-thione, 3-(2-carboxyethyl)-benzothiazoline-2-thione, 3-(2-carboxyethyl)-4-methyl-4-thiazoline-2-thione, and combinations of these silver salts. Examples of useful metal salts which are not silver salts include nickel perchlorate, lead behenate, copper stearate and the like. Useful reducible metal salts are also described in U.S. Pat. No. 3,437,075 of Morgan et al, issued July 22, 1969; U.S. Pat. No. 3,152,904 of Sorensen et al, issued Oct. 13, 1964; U.S. Pat. No. 3,152,903 of Sorensen et al, issued Oct. 13, 1964; British Specification No. 1,161,777, published Aug. 20, 1969; U.S. Pat. No. 3,672,904 of deMauriac issued June 27, 1972; and U.S. Pat. No. 3,785,830 of Sullivan et al, issued Jan. 15, 1974, all incorporated herein by reference.

Visible light sensitive, reducible metal salts, which are also charge sensitive can be used in lieu of, or in combination with, the previously described visible light insensitive metal salts. The charge sensitive materials can, for example, contain photosensitive salts, such as photosensitive silver salts including, for example, photographic silver halide. Useful photographic silver halides include, for example, silver chloride, silver bromide, silver bromoiodide, silver chlorobromoiodide or mixtures thereof. For purposes of the invention, silver iodide is also useful and included within the scope of the term photographic silver halide. The photosensitive silver halide can be prepared in situ in the charge sensitive material by employing procedures as described, for example, in U.S. Pat. No. 3,457,075 and/or the photosensitive silver halide can be prepared separate from other components of the charge sensitive material and then mixed with the described other components at the desired time. The photosensitive silver halide can be a coarse or fine grain, very fine grain photosensitive silver halide being especially useful. The photographic silver halide can be prepared by any of the well-known procedures employed in the photographic art, such as described in the above patent.

The photosensitive silver halide can be chemically sensitized, and can contain addenda commonly employed in photographic silver halide materials, such as sensitizing dyes, stabilizers, antifoggants, hardeners, coating aids and the like.

A variety of reducing agents for the reducible metal salts are useful in the described charge sensitive materials. Useful reducing agents are described in the above patents. Useful reducing agents include, for example, sulfonamidophenol reducing agents, as described in U.S. Pat. No. 3,801,321 of Evans et al, issued Apr. 2, 1974, polyhydroxy-benzenes such as hydroquinone, alkyl substituted hydroquinones, such as tertiary butyl hydroquinone, methylhydroquinone, 2,5-dimethylhydroquinone and 2,6-dimethylhydroquinone; catechols and pyrogallols; aminophenol reducing agents, such as 2,4-diaminophenols and methylaminophenols; ascorbic acid reducing agents such as ascorbic acid and ascorbic acid derivatives; hydroxylamine reducing agents; 3-pyrazolidone reducing agents such as 1-phenyl-3-pyrazolidone and 4-methyl-4-hydroxymethyl-1-phenyl-3-pyrazolidone; and bis-beta-naphthols, such as described in U.S. Pat. No. 3,672,904 of deMauriac issued June 27, 1972, and the like. Combinations of reducing agents can be employed if desired.

A range of concentration of reducing agent can be employed in the described current sensitive materials. A useful concentration of reducing agent based on the reducible metal salt, such as based on silver behenate or silver stearate, is typically about 0.1 mole to about 10 moles of reducing agent per mole of reducible metal salt. When reducing agents are employed in combination, the total concentration of reducing agent is typically within the described concentration range. The most useful concentration of reducible metal salt in a particular charge sensitive material will depend upon several factors, such as the current sensitivity of the materials in the recording element, the desired image, processing conditions and the like.

The described charge sensitive materials can include a variety of binders, especially polymeric binders, also known as vehicles. Useful polymeric binders can be hydrophobic or hydrophilic. They include both naturally occurring substances such as proteins, for example, gelatin, gelatin derivatives, cellulose derivatives, polysaccharides such as dextran, gum arabic and the like; and synthetic polymeric substances such as water-soluble polyvinyl compounds like poly(vinylpyrrolidone), acrylamide polymers and the like. Other synthetic polymeric compounds which are useful include dispersed vinyl compounds such as in latex form and particularly those which increase dimensional stability of the current sensitive materials. Effective polymers include water insoluble polymers of alkyl acrylates and methacrylates, acrylic acid, sulfoalkylacrylates, methacrylates and those which have crosslinking sites which facilitate hardening or curing as well as those having recurring sulfobetaine units as described in Canadian Patent No. 774,054. Especially useful polymers include polycarbonate, poly(vinyl butyral), cellulose acetate butyrate, poly(methylmethacrylate), poly(vinylpyrrolidone), ethyl cellulose, polystyrene, polyvinyl chloride, chlorinated rubber, polyisobutylene, butadiene-styrene copolymers, vinyl chloride-vinyl acetate copolymers, copolymers of vinyl acetate, vinyl chloride and maleic acid and poly(vinyl alcohol). Choice of an optimum polymer as a binder for the described charge sensitive materials will depend upon the particular charge sensitive material, the particular reducible metal salt, the particular reducing agent, processing conditions, and the like. It is essential that the binder not adversely affect the desired properties of the charge sensitive material. Useful polymeric binding agents are described in the patents describing useful reducible metal salts.

The charge sensitive layer of a recording material employed in the practice of the invention can be on a wide variety of supports. Typical supports include cellulose nitrate film, cellulose ester film, poly(viny acetal) film, polystyrene film, poly(ethylene terephthalate) film, polycarbonate film and related films or resinous materials, as well as glass, paper, metal and the like. However, if the support is an insulator, the recording element must also include an electrically conductive layer positioned between the support and the charge sensitive layer. Typically a flexible support is employed, especially a paper support. The paper support can be coated with baryta and/or a solvent holdout layer.

The charge sensitive layers used in the practice of the invention can contain addenda commonly employed in thermographic and photothermographic elements. Addenda in the charge sensitive layers useful in the practice of the invention include toners, also known as activator toners, such as described in U.S. Pat. No. 3,457,075 of Morgan et al., issued July 22, 1969; U.S. Pat. No. 3,672,904 of deMauriac, issued June 27, 1972 and U.S. Pat. No. 3,801,321 of Evans et al, issued Apr. 2, 1974; plasticizers and/or lubricants, surfactants, matting agents, brightening agents, light absorbing materials, filter dyes, and the like also as described in these patents.

The various components of the charge sensitive materials employed in the practice of the invention can be coated employing aqueous solutions or suitable organic solvent solutions depending on the particular charge sensitive material. The components can be added using various procedures known in the photographic art.

The charge sensitive layer of a recording material employed in the practice of the invention can be coated by using various coating procedures known in the photographic art including dip coating, air knife coating, curtain coating or extrusion coating using hoppers of the type described in U.S. Pat. No. 2,681,294 of Begiun, issued June 15, 1954. If desired, two or more layers can be coated simultaneously by procedures known in the art.

An especially useful charge sensitive, dry chemically developable recording material comprises an electrically conductive support having thereon a layer comprising (a) an image-forming combination including (i) a silver salt of a long-chain fatty acid, such as silver behenate or silver stearate, with (ii) a reducing agent as described, in (b) a polymeric binder, also as described.

Overall heating of the recording material can be accomplished in a variety of known ways, for example, by placing the recording material on a heated platen, by passing the recording material between heated rollers, or by applying radiant energy, e.g. from heating lamps, microwave devices, ultrasonic devices, etc., to the recording material. A useful temperature for producing the developed image is typically within the range of about 80°C–250°C such as about 115°C to about 175°C. The optimum range will depend on several factors such as the desired image, the ingredients of the particular recording material, etc. The time of overall heating typically ranges from about 0.1 second to about 120 seconds depending upon the particular recording material and, more importantly, the type of heating device employed. Heating is accomplished under atmospheric pressure conditions, however, pressure above or below this level may be used if desired.

The opto-electrical transducer device comprises a coating of a photoconductive insulating material on a conductive support. Any photoconductive insulating material whose dark current is below the level required to form a latent image in the recording material within a reasonable period of time and with sufficient persistent conductivity to permit current to flow through the recording material in the areas corresponding to the exposed areas of the photoconductive material for a period of time sufficient for latent image amplification is useful in the present invention. Useful photoconductor materials exhibiting persistant conductivity include, for example, lead oxide, zinc oxide, poly-N-vinyl carbazole and diphenyl aminocinnamic acid.

The photoconductive coating can also include a variety of binders and/or sensitizer known in the electrophotographic art. Useful binders are described, for example, in U.S. Pat. No. 2,361,019 of Gerhart issued Oct. 24, 1944 and in U.S. Pat. No. 2,258,423 of Rust issued Oct. 7, 1941. Suitable binders for use in the photoconductive layer are sold under such tradenames as VITEL PE 101, CYMAC, LEXAN 145 and PLIOLITE S-5. Sensitizing compounds useful in the photoconductive layers are described in U.S. Pat. No. 3,250,165 of VanAllan et al issued May 10, 1966; U.S. Pat. No. 2,610,120 of Minsk et al issued Sept. 9, 1952; U.S. Pat. No. 2,670,284 of Zvanut issued Feb. 23, 1954; U.S. Pat. No. 2,670,286 of Minsk et al issued Feb. 23, 1954; U.S. Pat. No. 2,670,287 of Minsk et al issued Feb. 23, 1954 and U.S. Pat. No. 2,732,301 of Roberston et al issued Jan. 24, 1956.

As noted above, the photoconductive coating or layer is carried on a conductive support. Useful support materials include paper, carbon containing layers such as conductive carbon particles dispersed in a resin binder, metal-coated papers, metal-paper laminates, metal plates or foils, vapor desposited metal layers such as silver, nickel or aluminum on conventional film supports, e.g., cellulose acetate, cellulose nitrate, polystyrene, poly(ethylene terephthalate), poly(vinyl acetol) and polycarbonate and glass plates coated with conductive or semiconductive films, such as tin oxide coated glass.

The photoconductive element used in the practice of the invention can utilize an interlayer between the conducting support and the photoconductive layer. Useful interlayers are described in U.S. Pat. No. 3,438,773 of Hayashi et al, issued Aug. 15, 1969 and in U.S. Pat. No. 2,901,348 of Dessauer issued Aug. 25, 1959. A combination of two or more interlayers can also be used such as a cellulose nitrate interlayer contiguous to the conductive support and a separate adhesive interlayer to bond the photoconductive layer to the cellulose nitrate interlayer.

The photoconductive element can be overcoated with an outer protective layer if desired. Suitable overcoats are described, for example, in U.S. Pat. No. 2,901,348, of Dessauer issued Aug. 25, 1959; U.S. Pat. No. 3,146,145 of Kinsella issued Aug. 25, 1964; U.S. Pat. No. 2,860,048 of Deubner issued Nov. 11, 1958; U.S. Pat. No. 3,288,604 of Corrsin issued Nov. 29, 1966 and U.S. Pat. No. 3,092,493 of Kaiser issued June 4, 1963.

An especially useful photoconductive element comprises an electrically conductive transparent support formed by vacuum depositing nickel on a sheet of poly-(ethylene) terephthalate film, the support having thereon a photoconductive layer comprising (i) lead monoxide in (ii) PLIOLITE S-5. (PLIOLITE S-5 is a trademark of the Goodyear Rubber Company used to designate a copolymer of a predominant proportion of styrene with a small proportion of butadiene).

Referring now to the drawings and in particular to FIG. 1, one embodiment of apparatus useful in carrying out the novel electrographic process of the invention is depicted schematically. A photoconductive element 10 comprising a lead oxide photoconductive insulating layer 12, a transparent metal conducting layer 14 and a transparent support layer 16 is placed in face to face contact with a recording material 18, comprising a current-sensitive, dry processable recording layer 20 and an electrically conducting support 22. A metal electrode is placed in contact with the support 22. Electric leads 25 from a source of D.C. potential 26 are attached to the electrode 24 and to the conductive layer 14 of the photoconductive element 10. The indicated polarity of source 26 is illustrative only.

To illustrate the operation of the invention, a series of exposures were made on the apparatus of FIG. 1 using a light and current sensitive recording material, Type 777 photothermographic paper manufactured by the Minnesota Mining and Manufacturing Company. The exposures were made by placing test objects on the photoconductive element 10 and applying an electrical potential of +3.0 kilovolts to the electric leads 25 while the photoconductive insulating layer 12 was exposed through the base 16 and conducting layer 14 to 100 milliroentgens of X-rays from a 110 kilovolt, 3 milliamp unfiltered Faxitron X-ray unit (not shown) positioned approximately 24 inches from the photoconductor-recording material sandwich. In the exposure of the first recording material sheet, both the X-ray exposure and the voltage application were terminated after one second. The recording material was then heat processed by uniformly heating the sheet at 140°C for approximately 2 seconds, at which time the current exposed portions of the recording material darkened slightly producing a faint negative image of the exposed test objects. Additional sheets of the recording material 18 were then exposed as described above but each time the voltage lag time (i.e. the time delay in terminating the applied voltage) was increased up to a maximum of 300 seconds. Processing occurred as described above.

Figure 2:
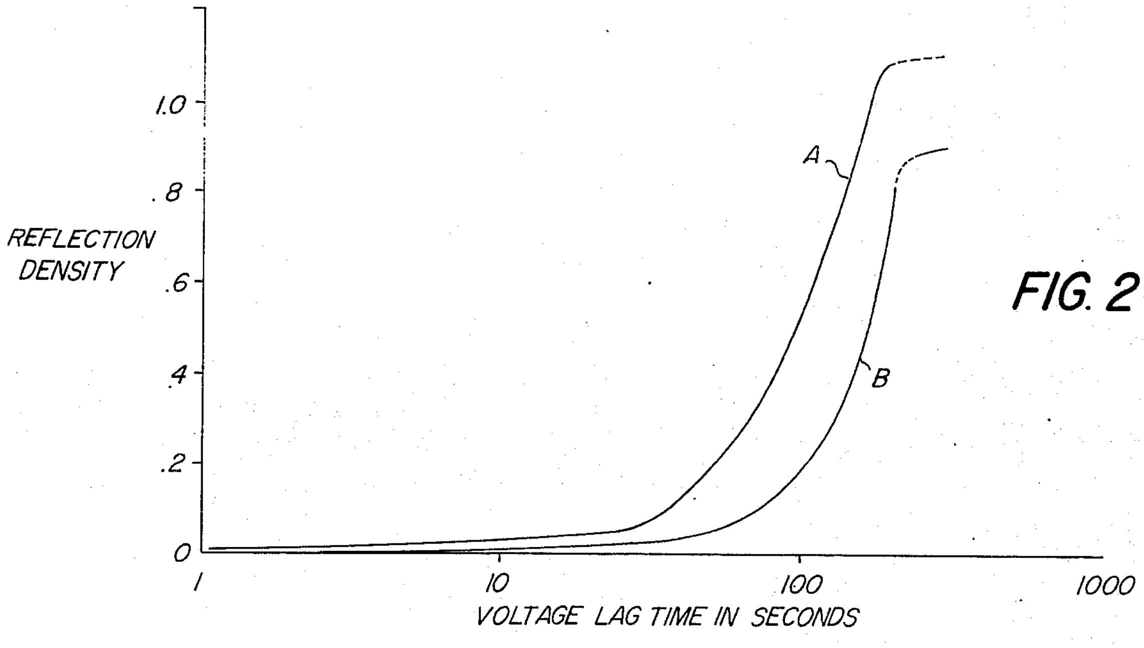
FIG. 2 is a graph showing the increase in reflection density of the image as a function of voltage lag time for two different recording materials.

Graph A of FIG. 2 shows the increase in reflection density of the processed recording material sample (plotted on the axis of the ordinates) as a function of the voltage lag time (plotted on the axis of the abscissas) from an identical image area on each of the samples that went from light to dark. Because there was some variation in the background density of the samples, such background density was also measured in each sample and subtracted from the density in the image areas and the resulting density difference $\Delta$ D was used as the ordinate of graph A.

A second set of prints was produced under identical conditions to those described in the preceding paragraph except that the charge-sensitive recording material did not contain any light sensitive silver halide. The charge sensitive recording material was prepared by ball milling the following components for 72 hours:

| | | |
|---|---|---|
| Silver behenate | 168.0 | grams |
| Behenic acid | 68.0 | grams |
| Poly(vinyl butyral) | 120.0 | grams |
| Phthalimide | 34.0 | grams |
| Acetone-toluene | 2.0 | liters |

This silver behenate-behenic acid dispersion was then combined with the following addenda in the order indicated, mixed thoroughly and coated on a suitable paper support at 6.0 g/ft$^2$

| | |
|---|---|
| Silver behenate-behenic acid dispersion (preparation described above) | 142.0 ml |
| Acetone-methanol solution (33:1 by volume) containing 0.1% by weight 3-carboxymethyl-5-[(3-methyl-2-thiazolidinylidene)-1-methylethylidene]rhodanine and 0.03% by volume triethylamine | 7.2 ml |
| Acetone solution containing 10% by weight 2,2'-dihydroxyl-1,1'-binaphthyl | 33.0 ml |
| Acetone solution containing 10% by weight 2,4-dihydroxybenzophenone | 5.0 ml |
| Acetone-toluene (1:1 by volume) | 46.0 ml |
| Methanol solution containing 1% by weight mercuric acetate | 12.0 ml |

The increase in reflection density of these processed recording material samples was measured as a function of voltage lag time in the same image areas as the preceding samples under the same controls and is shown as graph B of FIG. 2. For the particular recording materials used in this experiment, the graphs of FIG. 2 show that the reflection density increases at a slow rate for voltage lag time up to approximately 40 seconds but then increases at a very rapid rate for voltage lag times in the range of 40 to 300 seconds.

Figure 3:
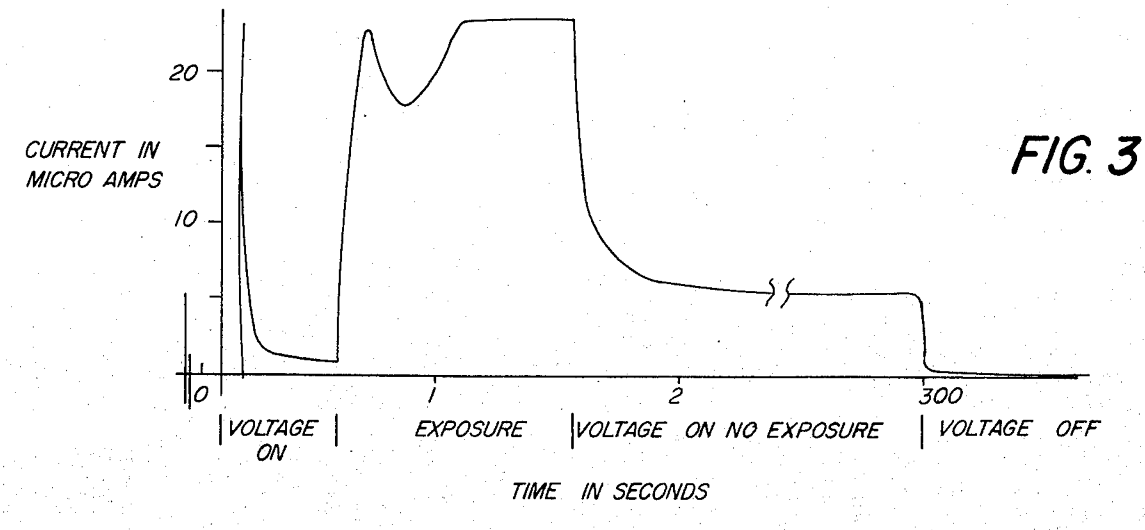
FIG. 3 is a graph showing the flow of current through the photoconductor-recording material sandwich during the various phases of the recording process.

A graph of the recorded flow of current through the photoconductor-recording material sandwich during the latent image forming process is shown in FIG. 3. In this test, the sandwich comprises a sheet of Type 777 photothermographic paper and a lead oxide photoconductor in Pliolite S-5 binder coated on a conductive base. An electrical field of 4 kilovolts was applied to the leads 25 while the photoconductive insulating layer 12 was exposed to radiation from the 110 kilovolt, 3 milliamp, X-ray source. The graph shows the low level of dark current through the photoconductor-recording material sandwich with the electrical potential applied and no exposure, then the relatively high flow of current during exposure; the decrease in current flow after termination of the exposure but with the continued application of the electrical potential; and finally the decrease in current flow to zero almost immediately when the potential is turned off. The quantity of charge which flows through the photoconductor-recording material sandwich during the period of continued application of the electric potential after termination of the exposure, exceeds by a factor of up to 10, the quantity of charge which flows through the photoconductive-recording material sandwich during the exposure. The total charge flow through the photoconductor-recording material sandwich during both the exposure time and the voltage lag time produces a charge density in the recording material of from approximately 1 microcouloumb/cm$^2$ to 1 millicouloumb/cm$^2$. For the particular materials tested, a charge density of this range of magnitude, will produce a maximum reflection density of approximately 1.0 (See FIG. 2)

It is to be noted that if the electric potential is removed upon termination of the exposure and then reapplied to the photoconductor-recording material sandwich there is no intensification of the latent image. This observation suggests that the persistent conductivity of the photoconductor can be maintained after termination of the exposure with continued application of the electric potential but rapidly drops below the minimum required conductivity when the electric potential is withdrawn.

From the foregoing, the beneficial effects of the present invention are readily apparent, a novel electrographic recording process has been disclosed which increases the sensitivity of certain charge-sensitive, dry processable recording materials exposed to a source of X-ray radiation. One advantage of increasing the sensitivity of such recording materials to X-ray radiation is that lower levels of the X-ray radiation can be used to produce a copy of a given density or contrast. Another advantage of the invention is that a considerable savings in time can be realized in non-destructive testing. Using a plurality of recording materials and an X-ray sensitive photoconductor, a minimum X-ray exposure is given to one recording material and the latent image produced is intensified by continuing application of the electric potential. During the electrical enhancement of the first latent image, the X-ray unit can be moved to expose the next recording material.

The invention has been described in detail with reference to a preferred embodiment thereof but it will be understood that variations and modifications can be effected within the spirit and scope of the invention.

I claim:

1. An electrographic recording process comprising the steps of:

a. positioning a persistent conductivity, X-ray sensitive photoconductive element adjacent a charge sensitive recording element containing a reducible metal compound in a binder;
b. exposing the photoconductive element to an imagewise pattern of X-ray radiation while simultaneously applying an electrical potential across the photoconductive and recording elements said potential being of a magnitude sufficient to produce a latent image in the recording element;
c. terminating the exposure of the photoconductive element and continuing the application of potential for a period of up to 300 seconds; and
d. heating the entire recording element substantially uniformly to render the latent image visible.

2. The process of claim 1 wherein said photoconductive element comprises a lead oxide photoconductor coated on a conducting base.

3. The process of claim 1 wherein said recording element is heated to a temperature in the range of about 115°C to about 175°C.

4. The process of claim 1 wherein said recording element contains at least one metal salt of an organic fatty acid and a reducing agent therefor.

5. The process of claim 4 wherein the metal salt is a silver salt of an organic acid.

6. The process according to claim 5 wherein the silver salt is selected from the group consisting of silver behenate, silver stearate, silver oleate, silver hydroxystearate, silver laurate, silver palmitate, silver caprate and silver myristate.

7. An electrographic recording process comprising the steps of:

a. positioning a persistent conductivity, X-ray sensitive photoconductive element adjacent a charge sensitive recording element containing a reducible metal compound in a binder;
b. exposing the photoconductive element to an imagewise pattern of X-ray radiation while simultaneously applying an electrical potential of at least about 3 kilovolts across said photoconductive and recording elements, said potential being of a magnitude sufficient to produce a latent image in the areas of the recording element corresponding to the exposed areas of the photoconductive element;
c. terminating the exposure of the photoconductive element and continuing the application of potential for a period of up to 300 seconds; and
d. heating the entire recording element substantially uniformly to render the latent image visible.

8. An electrographic recording process comprising the steps of:

a. positioning a persistent conductivity, X-ray sensitive photoconductive element adjacent a charge sensitive recording element containing a reducible metal compound in a binder;
b. exposing the photoconductive element to an imagewise pattern of X-ray radiation while simultaneously applying an electrical potential across the photoconductive and recording elements, said potential being of a magnitude sufficient to produce a latent image in the areas of the recording element corresponding to the exposed areas of the photoconductive element;
c. terminating the exposure of the photoconductive element and continuing the application of potential until a charge density of from approximately 1 microcouloumb/cm$^2$ to 1 millicouloumb/cm$^2$ is produced in the areas of the recording element containing said latent image; and
d. heating the entire recording element substantially uniformly to render said latent image visible.

9. An electrographic process comprising the steps of:

a. positioning a persistent conductivity, X-ray sensitive photoconductive element adjacent a charge sensitive recording element containing a reducible metal compound in a binder;
b. exposing the photoconductive element to an imagewise pattern of X-ray radiation while simultaneously applying an electrical potential of at least about 3 kilovolts across the photoconductive and recording elements, said potential being of a magnitude sufficient to produce a latent image in the areas of the recording element corresponding to the exposed areas of the photoconductive element;
c. terminating the exposure of the photoconductive element and continuing the application of potential until a charge density of from approximately 1 microcouloumb/cm$^2$ to 1 millicouloumb/cm$^2$ is produced in the areas of the recording element containing said latent image; and
d. heating the entire recording element substantially uniformly to render said latent image visible.

* * * * *